UNITED STATES PATENT OFFICE.

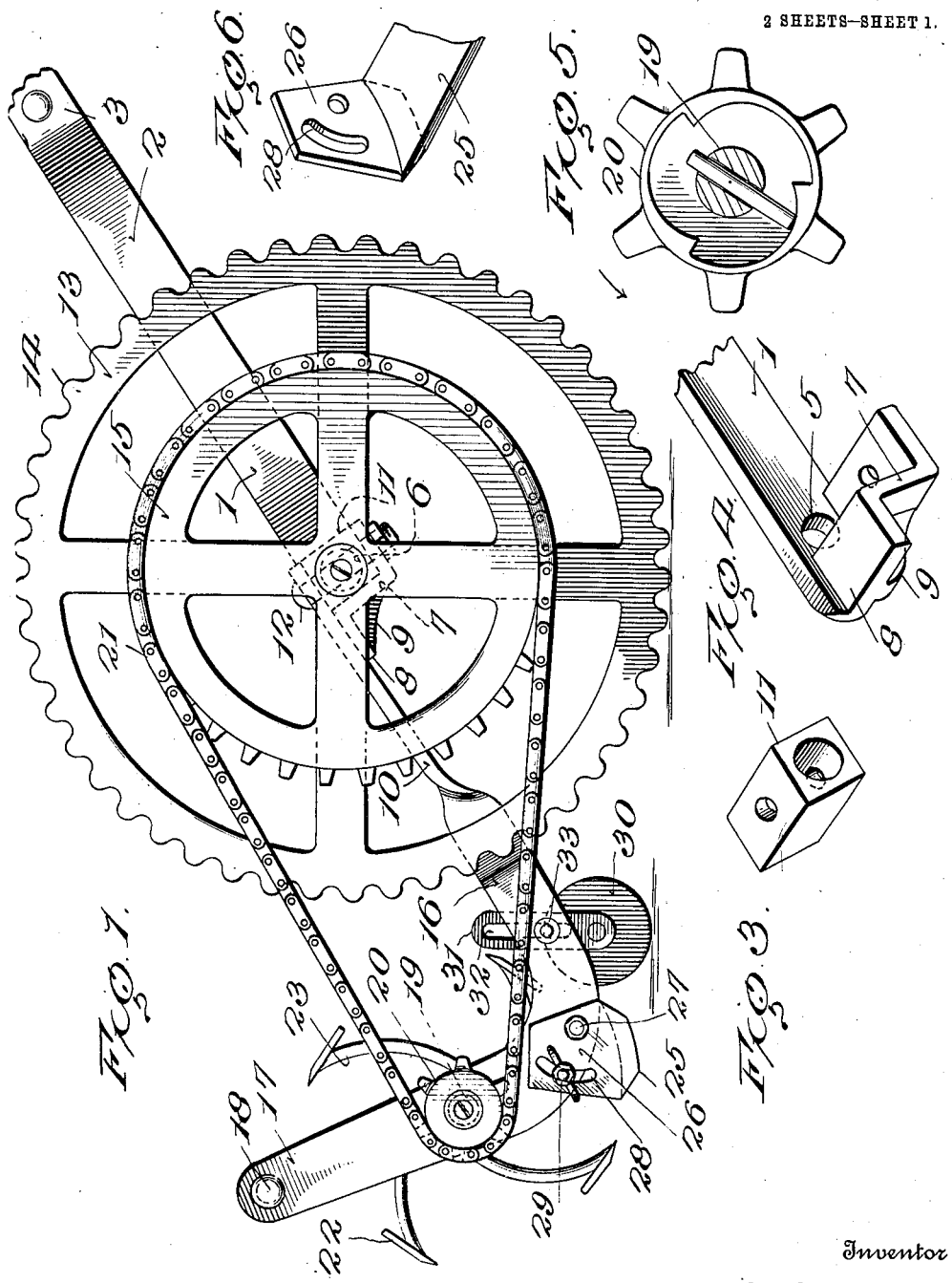

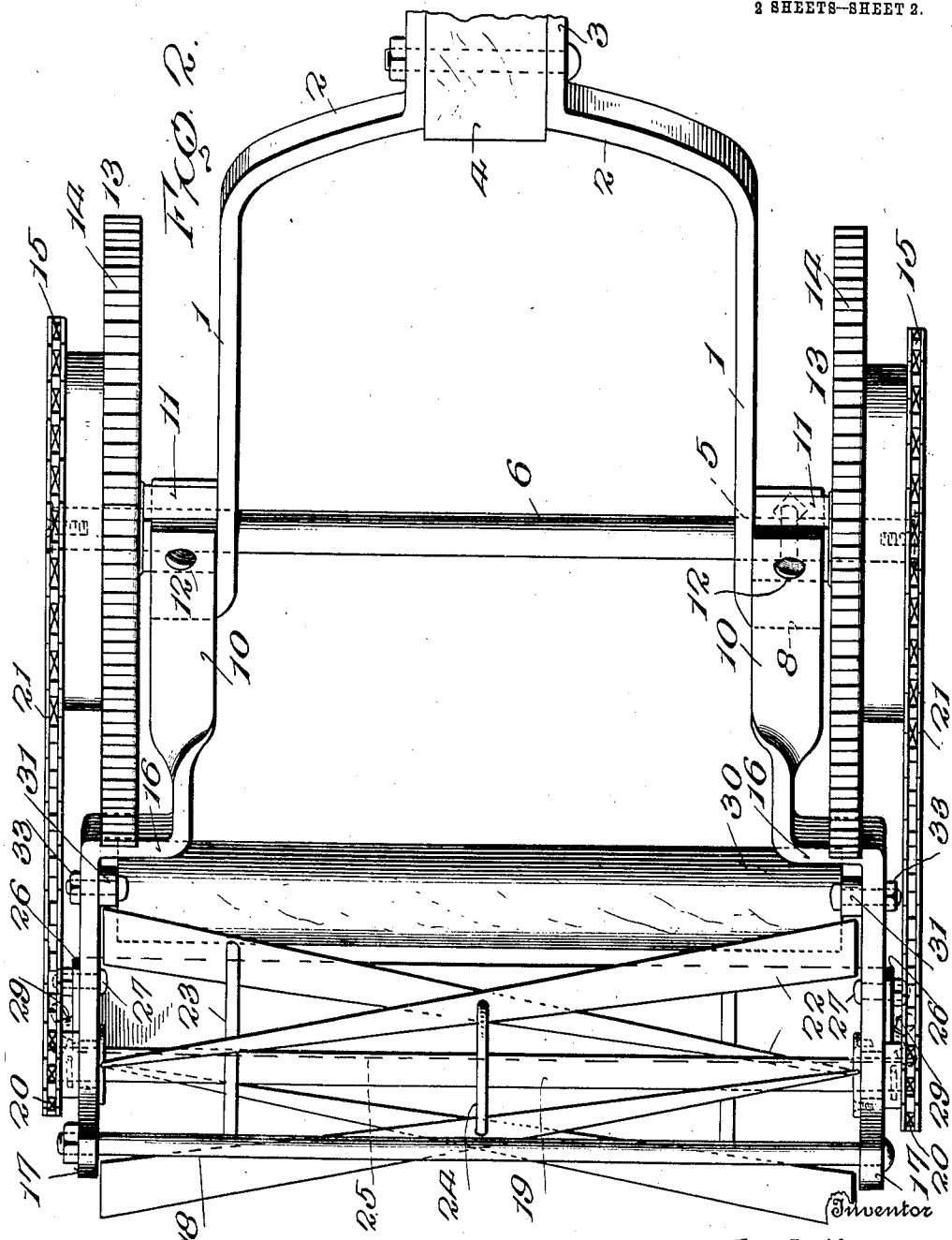

ROSS E. HEDGES, OF SCIO, OHIO.

LAWN-MOWER.

977,092.

Specification of Letters Patent.   Patented Nov. 29, 1910.

Application filed February 15, 1910.   Serial No. 544,105.

*To all whom it may concern:*

Be it known that I, Ross E. HEDGES, citizen of the United States, residing at Scio, in the county of Harrison and State of Ohio, have invented certain new and uesful Improvements in Lawn-Mowers, of which the following is a specification.

The primary object of this invention is a simple, durable, strong, light and efficient construction of lawn mower, the parts of which may be cheaply manufactured and readily assembled, the framework of which is so constructed that parts may be easily removed and replaced, whereby the grass may be cut close up to the walks, paths, or trees or the like, and whereby the driving mechanism is so arranged that grass of any length or thickness may be cut, and whereby the mower may be operated in a curved line as well as to cut a straight swath.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings in which:

Figure 1 is a side elevation of a lawn mower constructed in accordance with my invention: Fig. 2 is a top plan view thereof; Fig. 3 is a detail perspective view of a block employed; Fig. 4 is a detail perspective view of the forward end of one of the handle bars; Fig. 5 is a detail view of one of the rods; and, Fig. 6 is a detail perspective view of a portion of the knife bar.

Corresponding and like parts are referred to in the following description and indicated in all the views of the accompanying drawings by the same reference characters.

The framework of my improved lawn mower embodies preferably metallic handle bars 1 the main portions of which extend parallel to each other as shown the rear upper ends converging as indicated at 2 and being thence extended parallel with each other as indicated at 3 to receive between them the ordinary wooden handle 4. Near their lower forward ends, the handle bars 1 are apertured as indicated at 5 to receive the transversely extending preferably stationary shaft or axle 6 and beyond said axle the handle bars are outwardly and laterally deflected as indicated at 7 and formed at their extremities with laterally extending ledges 8 connected to the deflected portions 7 by webs 9. The framework also includes removable side bars 10 which extend downwardly and forwardly from the shaft or axle 6, the rear portions of the side bars 10 resting upon the ledges 8 and upon the upper edges of the deflected portions 7 as clearly illustrated in the drawings. Blocks 11 are adapted to be slipped over the ends of the shaft or axle 6 behind the deflected portions 7 of the handle bars 1 and underneath the upper ends of the side bars 10, and bolts 12 extend through apertures formed in the upper rear ends of the side bars 10 and down through the respective blocks 11 and the portions of the axle which they encircle, whereby to securely but detachably hold the parts in place. Ground wheels 13 preferably formed with corrugated peripheries 14 are mounted on the ends of the shaft or axle 6 and are held thereon by any desired means. Preferably formed integrally with the ground wheels 13 are the two driving sprockets 15.

Referring again to the framework of the apparatus, it will be seen that the side bars 10 which extend downwardly and forwardly from the shaft or axle 6, are outwardly deflected as at 16 and twisted to present their side faces in substantially vertical planes, the forward ends of the side bars preferably lying somewhat beyond the margins of the ground wheels 13 and curving forwardly and thence upwardly as indicated at 17. The foremost extremities of the side bars are connected together by a tie rod and guard 18 as shown.

19 designates a transversely extending shaft which carries the cutter bars. This shaft is journaled in suitable bearings formed in the upwardly and forwardly extending end portions of the side bars 10 the shaft projecting beyond the side bars and carrying at each end a ratchet sprocket 20, the sprockets 20 being connected by sprocket chains 21, to the main driving sprockets 15 at both sides of the machine, this arrangement not only effecting a strong and operative drive connection between the shaft 19 and the ground wheels 13 but admitting of one sprocket 20 operating faster than the other so that the mower may work just as well in cutting curved swaths as in cutting straight swaths.

The cutter bars designated 22 are four in number in the present instance, although it is to be understood that any desired number may be employed and they extend obliquely as shown being secured in any desired way to the outer ends of the arms 23 that extend from the shaft 19 and which are preferably curved forwardly in the direction of rotation of said shaft. In addition to the arms 23, the cutter bars 22 are all joined together at middle points by a bracing hoop 24 which extends therethrough as clearly illustrated in the drawings.

Coacting with the series of cutter bars 22 is a knife bar 25 which extends transversely underneath the side bars 10 just in the rear of the cutter bars 22 and which is preferably formed integral with end brackets 26. The end brackets are pivotally connected to the side bars 10 as at 27 and are respectively formed with curved slots 28 accommodating set screws 29 whereby the position of the knife may be adjusted as required, as for example, when the cutter bars 22 become worn. Back of the knife bar 25 a roller 30 is mounted, said roller being journaled in hangers 31 which are formed with vertical slots as indicated at 32, set screws 33 being accommodated in said slots and secured to the side bars 10 of the framework whereby the roller 10 may be vertically adjusted.

From the foregoing description in connection with the accompanying drawing, the operation of my improved lawn mower will be apparent. In the practical use of the apparatus, it is obvious that the rotation of the ground wheels 13 and the sprocket wheels 15 which are preferably cast integral with the ground wheels, as the apparatus is pushed over the lawn will rotate the shaft 19 and impart a revolving movement to the cutter bars 22 which will coact with the knife bar 25 and effectively cut the grass irrespective of the length thereof. The width of the cutter bars 22 and the fact that they extend at least to points flush with the outer side faces of the ground wheels 13 provide that the grass can be cut very close to the walks or paths or trees or other obstructions which would otherwise not be the case and it is also to be noted that with my construction and arrangement of parts, the machine will work equally as well in curves as on a straight line, owing to the fact that the shaft 19 is driven from both ends by ratchet sprockets as above described. Furthermore, by constructing the framework as illustrated in the drawings, and in the preceding portion of the specification it is clear that the side bars 10 or either of them may be easily detached and the parts removed and replaced whenever necessary without unshipping the entire framework or the axle 6 or in fact without removing the ground wheels.

Having thus described the invention, what is claimed as new is:

1. In a lawn mower, a framework embodying handle bars provided near one end with apertures, a transversely extending stationary shaft having its ends passed through said apertures, the handle bars being formed with outwardly deflected ends in front of the shaft and with ledges in front of said ends, the handle bars being further provided with webs connecting the ledges and deflected ends, blocks mounted on the ends of the shaft and engaging the rear faces of the deflected ends of the handle bars, side bars having their rear ends resting upon said ledges and formed at the rear of said ledges with apertures, bolts extending through the apertures in the respective side bars and through the blocks and shaft whereby to detachably secure the parts together, ground wheels journaled on the ends of said shaft, the side bars extending downwardly and forwardly from their attached ends, a cutter bar shaft journaled in the side bars, cutter bars carried thereby, and a driving connection between the ground wheels and the cutter bar shaft.

2. In a lawn mower, a framework embodying handle bars provided near one end with apertures, a transversely extending stationary shaft having its ends passing through said apertures, the handle bars being formed with outwardly deflected ends in front of the shaft and with ledges in front of said ends, side bars having their rear ends resting upon said ledges and formed at the rear of said ledges with apertures, bolts extending through the apertures in the respective side bars and through the shaft, whereby to detachably secure the parts together, ground wheels journaled on the ends of said shaft, the side bars extending downwardly and forwardly from their attached ends, a cutter bar shaft journaled in the side bars, cutter bars carried by the cutter bar shaft, and a driving connection between the ground wheels and the cutter bar shaft.

In testimony whereof I affix my signature in presence of two witnesses.

ROSS E. HEDGES. [L. S.]

Witnesses:
G. D. SPIKER,
I. W. BROUGH.